(12) United States Patent
Schwerdtner et al.

(10) Patent No.: US 8,493,642 B2
(45) Date of Patent: Jul. 23, 2013

(54) METHOD FOR GENERATING VIDEO HOLOGRAMS FOR A HOLOGRAPHIC DISPLAY DEVICE WITH RANDOM ADDRESSING

(75) Inventors: Armin Schwerdtner, Dresden (DE); Alexander Schwerdtner, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 314 days.

(21) Appl. No.: 12/600,325

(22) PCT Filed: May 16, 2008

(86) PCT No.: PCT/EP2008/056023
§ 371 (c)(1),
(2), (4) Date: Nov. 16, 2009

(87) PCT Pub. No.: WO2008/138980
PCT Pub. Date: Nov. 20, 2008

(65) Prior Publication Data
US 2010/0149610 A1    Jun. 17, 2010

(30) Foreign Application Priority Data
May 16, 2007 (DE) .......................... 10 2007 023 740

(51) Int. Cl.
*G03H 1/08* (2006.01)
*G02B 5/32* (2006.01)
(52) U.S. Cl.
USPC .................................. 359/9; 359/21; 359/900
(58) Field of Classification Search
USPC ...................................................... 359/32, 21
See application file for complete search history.

(56) References Cited

U.S. PATENT DOCUMENTS

| 2003/0156306 A1 | 8/2003 | Kitamura |
| 2006/0139711 A1 | 6/2006 | Leister et al. |
| 2008/0198431 A1* | 8/2008 | Schwerdtner ................... 359/32 |

FOREIGN PATENT DOCUMENTS

| DE | 102005023743 A1 * | 11/2006 |
| JP | 10-171336 | 6/1998 |
| JP | 10171336 A * | 6/1998 |
| WO | WO 2006/021818 | 3/2006 |
| WO | WO 2006/119760 | 11/2006 |
| WO | WO 2006/134398 | 12/2006 |

OTHER PUBLICATIONS

International Search Report, dated Nov. 30, 2009, issued in priority International Application No. PCT/EP2008/056023.

(Continued)

*Primary Examiner* — Jade R Chwasz
(74) *Attorney, Agent, or Firm* — Saul Ewing LLP

(57) ABSTRACT

A method for generating video holograms for a holographic reproduction device with at least one light modulation means, wherein a scene split into object points is encoded as a whole hologram and can be seen as a reconstruction from a visibility region, which is located within a periodicity interval of the reconstruction of the video hologram. The visibility region, together with each object point of the scene to be reconstructed, defines a subhologram and the whole hologram is generated from a superposition of subholograms, wherein in a sequence of image contents the difference subholograms of object points are preferably generated for each picture, differing in regards to the visibility according to the viewer position in sequential images of the sequence. The display device comprises means that provide high-quality video holograms in spite of the data amount being significantly reduced.

20 Claims, 10 Drawing Sheets

OTHER PUBLICATIONS

Takahashi et al., "Direct volume access by an improved electro-holography image generator," Proceedings of the SPIE—The International Society for Optical Engineering, SPIE, US, Bd. 2406, (Jan. 1, 1995), pp. 220-225 XP007903699.

* cited by examiner

METHOD FOR GENERATING VIDEO HOLOGRAMS FOR A HOLOGRAPHIC DISPLAY DEVICE WITH RANDOM ADDRESSING

CROSS REFERENCE TO RELATED APPLICATIONS

This application claims the priority of PCT/EP2008/056023, filed on May 16, 2008, which claims priority to German Application No. 10 2007 023740.7, filed May 16, 2007, the entire contents of which are hereby incorporated in total by reference.

BACKGROUND OF THE INVENTION

The present invention relates to a method for generating video holograms for a holographic display device with random addressing.

The means for implementing the method will be referred to as content generation means. According to the method, the content generation means generate the hologram values which are required for the representation in the holographic display device, and can thus be interpreted as data source. The generated hologram values can be transmitted directly to the holographic display device or stored in digital storage means.

A holographic display device with random addressing is interpreted as data receiver and provides the holographic representation of the hologram data which are generated according to the method or the content generation means.

Real-time reconstruction of holograms has proved its suitability in many important applications thanks to the progress made in hardware components and computation methods. A major challenge in digital holography is to cope with the amount of data per image, which is much larger than that of conventional video information. This large amount of data makes great demands on storage media and data transmission means such as network components and bus systems. Already the transmission and processing of conventional video data makes great demands on those resources.

A holographic display device is substantially based on the principle that a sub-hologram is defined together with each object point of the scene to be reconstructed and that the entire hologram is formed by a superposition of sub-holograms, with the help of at least one light modulator means on which a scene which is divided into object points is encoded as an entire hologram and where the scene can be seen as a reconstruction from a visibility region which lies within one periodicity interval of the reconstruction of the video hologram. In general, the principle is to reconstruct mainly that wave front that would be emitted by an object into one or multiple visibility regions.

In detail, such a device is based on the principle that the reconstruction of an individual object point only requires a sub-hologram as a subset of the entire hologram encoded on the light modulator means. The holographic display device comprises at least one screen means. The screen means is either the light modulator itself, where the hologram of a scene is encoded, or an optical element—such as a lens or a mirror—onto which a hologram or wave front of a scene encoded on the light modulator is projected.

In this document, the term 'light modulator means' or 'SLM' denotes a device for controlling intensity, colour and/or phase of light by way of switching, gating or modulating light beams emitted by one or multiple independent light sources. A holographic display device typically comprises a matrix of controllable pixels, which reconstruct object points by modifying the amplitude and/or phase of light which passes through the display panel. A light modulator means comprises such a matrix. The light modulator means may for example be an acousto-optic modulator AOM or a continuous-type modulator. One embodiment for the reconstruction of the holograms by way of amplitude modulation can take advantage of a liquid crystal display (LCD). The present invention also relates to further controllable devices which are used to modulate sufficiently coherent light into a light wave front or into a light wave contour.

The term 'pixel' denotes a controllable hologram pixel of the light modulator, it represents a discrete value of the hologram point and is addressed and controlled discretely. Each pixel represents a hologram point of the hologram. In the case of an LC display, a pixel is a discretely controllable display pixel. In the case of a DMD (Digital Micro-mirror Device), such as a DLP (Digital Light Processor), a pixel is a discretely controllable micro-mirror or small group of such mirrors. In the case of a continuous light modulator means, a pixel is an imaginary region which represents the hologram point. In the case of a colour representation, a pixel is typically sub-divided into multiple sub-pixels, which represent the primary colours.

The term 'transformation' shall be construed such to include any mathematical or computational technique which is identical to or which approximates a transformation. Transformations in a mathematical sense are merely approximations of physical processes, which are described more precisely by the Maxwellian wave equations. Transformations such as Fresnel transformations or the special group of transformations which are known as Fourier transformations, describe second-order approximations. Transformations are usually represented by algebraic and non-differential equations and can therefore be handled efficiently and at high performance using known computing means. Moreover, they can be modelled precisely using optical systems.

The transfer of image data from the content generation units, i.e. data source and visualisation module (e.g. an LCD or CRT monitor as data receiver) conventionally works such that the entire content of an image is output line by line from top to bottom, as with conventional tube monitors. This does not pose a problem for HDTV monitor resolutions, because the required amount of data can be transferred fast enough through standardised interfaces, for example Digital Visual Interface (DVI) or High Definition Multimedia Interface (HDMI).

The means for the content generation, i.e. the data source, are for example graphics cards or graphics sub-systems where the 3D rendering pipeline is implemented. A 3D rendering graphics pipeline describes the way from the vectorial, mathematical description of a three-dimensional scene to pixelated image data in a frame buffer in order to be displayed on a monitor screen. The three-dimensional image data comprise depth information and usually also additional information about material and surface properties. For example, the conversion of screen coordinates into device coordinates, texturing, clipping and anti-aliasing are performed in that pipeline. The pixelated image, which represents a two-dimensional projection of the three-dimensional scene, and which is stored in the frame buffer of a graphics adapter, comprises the pixel values for the controllable pixels of a monitor screen, for example an LC display. The holographic pipeline generates the complex hologram values for the representation on the holographic display device from the results of the 3D rendering graphics pipeline.

Holographic display devices require a much larger number of pixels than a conventional two-dimensional display, and thus a much larger amount of data for the hologram values. The object of the present invention is to provide a method which significantly reduces the generated amount of data for video holograms. The amount of data which is to be transferred between the data source, i.e. content generation means, and the data receiver, i.e. the holographic display device, shall thus be minimised. Consequently, the amount of data which is required to be stored for the video holograms in digital storage media shall also be reduced. Further, a holographic display device shall be provided which ensures that the sequence is represented without a loss of quality also with that reduced amount of data. The method shall take advantage of known means for data storage and transfer. A manageable amount of data shall contribute to improving acceptance and distribution of video holograms.

During the transfer as described in the prior art, the entire amount of data is transferred per image or video frame of a sequence from the content generation means, i.e. the data source, to a holographic displays device, i.e. the data receiver. This means that the entire hologram information is transferred, including those pieces of information which do not change from one image to the next one. Because a hologram reconstructs object points in a three-dimensional space, it is sufficient to know which object points have changed in a video frame compared to the previous video frame. The modification particularly relates to the position, but also to the colour and intensity.

The method for generating video holograms according to this invention is particularly suited for holographic display devices with at least one light modulator means on which a scene which is divided into object points is encoded as an entire hologram and where the scene can be seen as a reconstruction from a visibility region which lies within one periodicity interval of the reconstruction of the video hologram, where a sub-hologram is defined by the visibility region together with each object point of the scene to be reconstructed and where the entire hologram is formed by a superposition of sub-holograms. Such a holographic display device with light modulator means is based on the principle that the wave fronts which are modulated with the information of object points of a scene are superposed in at least one visibility region. The definition of a visibility region has already been given above.

Further, advantage is taken of the principle that the reconstruction of an individual object point of a scene only requires a sub-hologram as a subset of the entire hologram encoded on the light modulator means. Each single object point is created by one sub-hologram, whose position depends on the position of the object point, and whose size depends on the observer position. The region of the sub-hologram on the light modulator means will be referred to below as modulator region. The modulator region is that sub-region of the light modulator means which is required for reconstructing the object point. At the same time, the modulator region defines which pixels on the light modulator must be addressed in order to reconstruct that object point. The modulator region will remain in a fixed position if the object point is an object point which is fixed in space. This means that the object point to be reconstructed changes its position depending on the observer position. A change of the modulator region in dependence on the observer position allows the object point to be encoded at a fix position, i.e. its position in space does not change depending on the observer position. As far as the present invention is concerned, those principles can be applied analogously. According to a most simple embodiment, the centre of the modulator region lies on the straight line which runs through the object point to be reconstructed and the centre of the visibility region. In a most simple embodiment, the size of the modulator region is determined based on the theorem of intersecting lines, where the visibility region is traced back through the object point to be reconstructed to the light modulator means.

Also if sub-holograms are preferably used, a pixel, which represents the smallest controllable unit of the light modulator, does not only comprise the information of a single sub-hologram, but, as a result of the superpositions, the information of multiple sub-holograms.

SUMMARY OF THE INVENTION

The present invention is based on the idea that in a sequence of images the differential sub-hologram of an object point which is now visible and an object point which is now covered by the other object point, or vice versa, is generated.

Related to the visibility from the observer eyes, a differential sub-hologram (see also the figures and embodiments below) is defined (a) By the difference of the sub-hologram of an object point which disappeared in the current image, and the sub-hologram of an object point which was covered by it in the preceding image and which is now visible or, vice versa, (b) By the difference of the sub-hologram of an object point which is now visible in the current image and the sub-hologram of an object point which was covered by the other object point in the preceding image, and (c) In the case of unchanged visibility, the sub-hologram of the colour and intensity changes at the position of the fixed object point, and/or data which describe such changes.

The displacement of an object point can generally be interpreted as appearance and disappearance of corresponding points and is included in the above-mentioned case differentiation of the visibility. Moreover, such cases are included too where no background is provided for object points. In those cases, the differential sub-hologram represents the corresponding sub-hologram of the object point.

For fix object points with unchanged visibility, the changes of colour and/or intensity are preferably defined by descriptive data or, if necessary, by corresponding sub-holograms.

According to the present invention, descriptive data are generated for each differential sub-hologram. The descriptive data generally serve the processing of the differential sub-holograms—and ultimately the representation in the holographic display device—to be made possible, to be controlled or to be facilitated. Descriptive data for example comprise the size of the differential sub-hologram, the position on the light modulator, pixel regions, references to memory sections, to indices and the like. The descriptive data thus allow high-performance processing, for example because the required references to memory sections enable quick data access. Further, the descriptive data for example serve to read the address range of the differential sub-hologram into a screen buffer of the holographic display device, or to determine the address range at a high performance. Those memory sections can thus be filled at a high performance, so that the corresponding pixels of the light modulator can finally be addressed. The descriptive data and the differential sub-hologram are combined for one point so to create the differential data.

According to this invention, further optimisations are made in the course of the generation of the holographic data. A control unit decides in an optimising manner whether it is more advantageous to generate the differential data, or to alternatively generate the entire hologram, i.e. the entire image content. If the image content has changed substantially, as for example is the case after cuts, a large amount of differential data which correspond with the object points must be transferred. It may take a greater effort to transfer the data or to process that amount of data in such case, than needed for the entire hologram of the entire image. The entire hologram is preferably generated in that case. The differential data can be generated, stored and transferred in any order, because according to this invention the differential sub-hologram is attached the information required for processing in the form of the descriptive data, as described in more detail above. In contrast to a strict line-by-line generation or transfer in known visualisation systems, the method according to the present invention allows a random generation and thus a random transfer and storage. The differential data are preferably transferred immediately, i.e. instantly after they have been computed, to the data receiver, e.g. to the holographic display device. It is also possible to combine the differential data of multiple points to data packets. According to the present invention, those generated data, i.e. differential sub-holograms and the corresponding descriptive data, are provided to digital storage means or directly transferred to the holographic display device.

The method according to this invention ensures that the amount of data required for video holograms can be reduced significantly. The advantage of the present invention is in particular that the higher the resolution of a light modulator of the holographic display device, the more often individual differential sub-holograms, i.e. a significantly smaller amount of data, will be transferred or stored instead of the entire hologram. It is also possible to transfer the entire hologram within defined intervals in order to provide a flawless quality of the holographic representation.

The significantly smaller amount of data allows video sequences to be stored on conventional digital storage media. As a particular advantage of this invention, the effort for data transfer via a computer network and the internet is reduced significantly.

According to a continuation of the present invention, the descriptive data are additionally provided with generalised information which allow the differential sub-holograms to be assigned to different holographic display devices which preferably implement the principle of the holograms. According protocols can be established or agreed upon as industry standards.

Based on the method and data source according to the present invention, the holographic display device is interpreted as the receiving unit. Means and method must thus be provided to the holographic display device in order to represent the holograms based on the video hologram data which have been generated according to the present invention. The holographic display device comprises at least one screen means. The screen means is either the light modulator itself where the hologram of a scene is encoded or an optical element—such as a lens or a mirror—onto which a hologram or wave front of a scene encoded on the light modulator is projected. The definition of the screen means and the corresponding principles for the reconstruction of the scene in the visibility region are described in other documents filed by the applicant. In documents WO 2004/044659 and WO 2006/027228, the light modulator itself forms the screen means. In document WO 2006/119760, titled "Projection device and method for holographic reconstruction of scenes", the screen means is an optical element onto which a hologram which is encoded on the light modulator is projected. In document DE 10 2006 004 300, titled "Projection device for the holographic reconstruction of scenes", the screen means is an optical element onto which a wave front of the scene encoded on the light modulator is projected. Document WO 2006/066919 filed by the applicant describes the above-mentioned method for computing video holograms.

The holographic display device comprises a screen memory or a corresponding memory architecture which allows pixel values to be read. The pixels of the light modulator means are addressed accordingly with the help of the pixel values. The screen memory is the memory of a graphics card where the data for a screen output is located. It is also referred to as video RAM (VRAM).

In accordance with the method, mainly the differential data, and not the entire hologram, are transferred to the holographic display device for each video frame. According to this invention, the holographic display device also comprises a splitter. Splitters are computing means which on the one hand detect differential data in the data flow which is generated according to the method, and separate the data of differential sub-holograms from the corresponding descriptive data on the other. With the help of the descriptive data, the splitter ensures for example that the differential sub-holograms are written to the respective memory sections of the screen memory and are thus provided to the light modulator means.

Light modulators are typically active matrix displays whose pixel values must be refreshed continuously in order not to lose information. If only those image contents were transferred to the light modulator which have changed, information would be lost in the regions with unchanged image contents. Object points which remain unchanged would thus not appear anymore. The entire image content must be available in the screen memory in each refresh cycle in such a light modulator, because the entire image content is read from the screen memory in one refresh cycle so that the pixels are addressed or refreshed accordingly.

According to this invention, the data of the differential sub-hologram are written to the screen memory at the same time. This is why a special screen memory or suitable memory architectures are suggested which are able to read and write simultaneously. This ensures that on the one hand the new differential sub-holograms are stored in the writing mode, and at the same time the entire screen memory is read in the reading mode and the information is transferred to the light modulator for addressing the pixels. Dual-port RAMs are preferably suggested as screen memory.

The differential sub-holograms are preferably generated particularly when using high-resolution display devices. The method according to this invention makes it possible to reduce the amount of data transferred from the content generation means to a holographic display device. Analogously, the demands made on storage means and transmission means are also reduced preferably. Known storage media allow a long video sequence to be stored. Known transfer means, e.g. internet, LAN, WLAN, DVI, HDMI and the like, analogously ensure a high-performance transfer.

BRIEF DESCRIPTION OF THE DRAWINGS

The invention will now be explained in more detail with the help of embodiments and in conjunction with the accompanying drawings, wherein.

A particularly preferred method for generating complex hologram values from sub-holograms will be explained in detail below with the help of accompanying drawings, wherein.

DETAILED DESCRIPTION

Figure 1A:
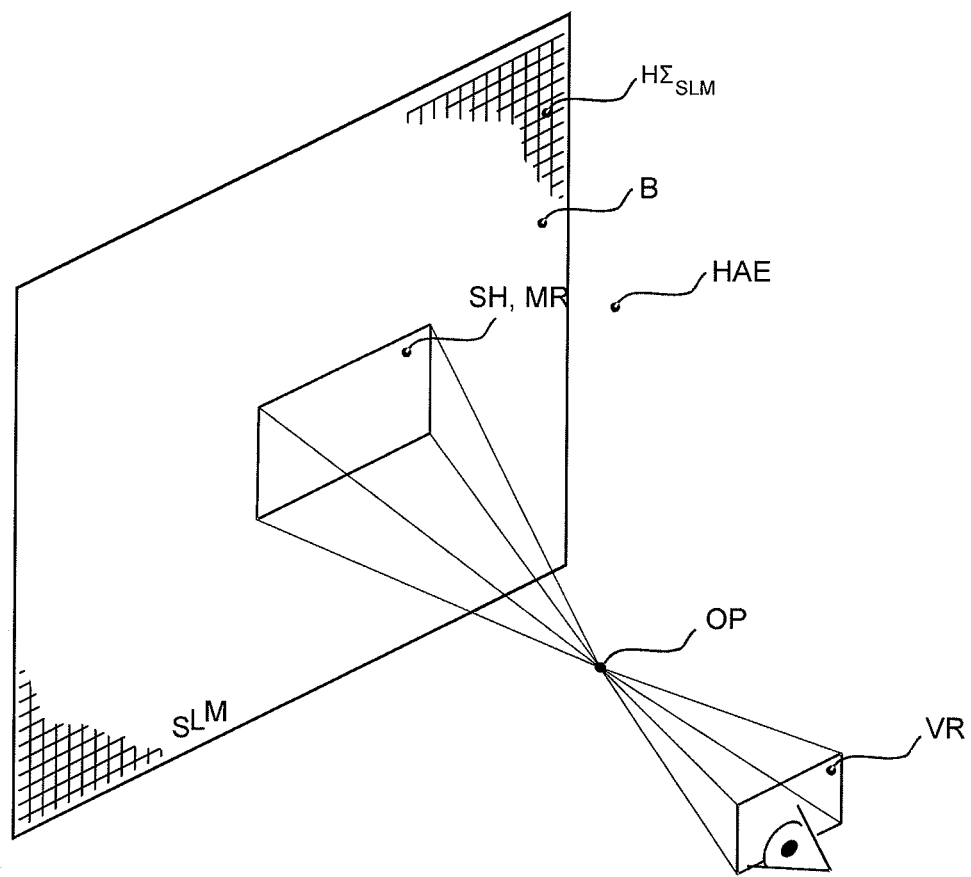
FIG. 1a illustrates the principle on which a holographic display device is based.

FIG. 1a illustrates the general principle on which a holographic display device (HAE) for one observer is based. The principle applies accordingly to multiple observers. The position of an observer is characterised by the position of his eye or his pupils (VP). The device comprises a light modulator means (SLM), which is identical to the screen means (B) in this embodiment in order to keep things simple; and it superposes the wave fronts which are modulated with information of object points of a scene (3D-S) in at least one visibility region (VR). The visibility region is tracked to the eyes. The reconstruction of a single object point (OP) of a scene (3D-S) only requires one sub-hologram (SH) as a subset of the entire hologram (H$\Sigma_{SLM}$) encoded on light modulator means (SLM). The modulator region (MR) is the region of the sub-hologram on the light modulator (SLM). As can be seen in this Figure, the modulator region (MR) only comprises a small subsection of the light modulator means (SLM). According to a most simple embodiment, the centre of the modulator region (MR) lies on the straight line through the object point (OP) to be reconstructed and through the centre of the visibility region (VR). In a most simple embodiment, the size of the modulator region (MR) is determined based on the theorem of intersecting lines, where the visibility region (VR) is traced back through the object point (OP) to be reconstructed to the light modulator means (SLM). Further, the indices of those pixels on the light modulator means (SLM) which are required to reconstruct this object point are thus determined.

Figure 1B:
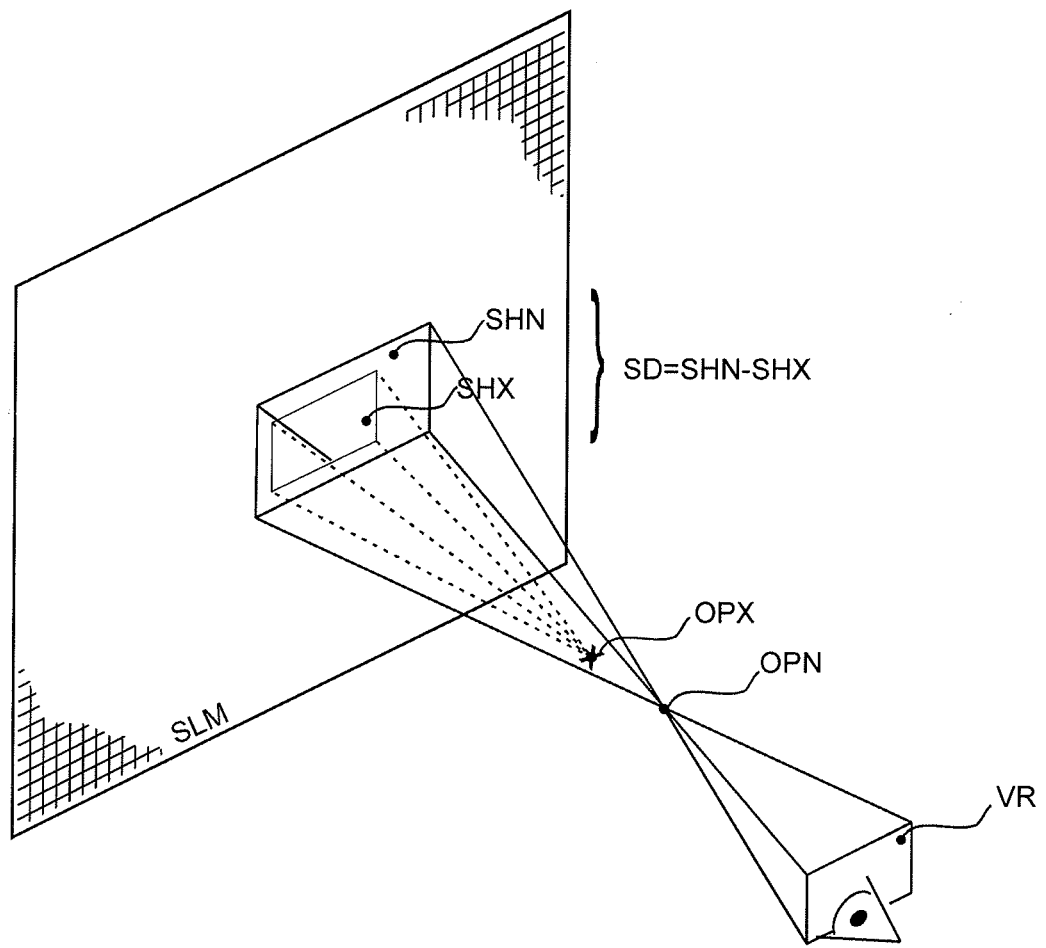
FIG. 1b shows the differential sub-hologram for an appearing point.

As shown in FIG. 1b, a new object point (OPN) appeared in the current image ($P_n$) of the sequence compared to the preceding image, said new object point, however, as shown in the Figure, covering an object point (OPX) which had been visible in the previous image ($P_{n-1}$), so that the initially visible object point now becomes invisible according to the visibility of the observer. In that case, the differential sub-hologram (SD=SHN−SHX) is defined as difference between the sub-hologram (SHX) of the object point (OPX) and the sub-hologram (SHN) of the point (OPN), and can thus be computed.

Figure 1C:
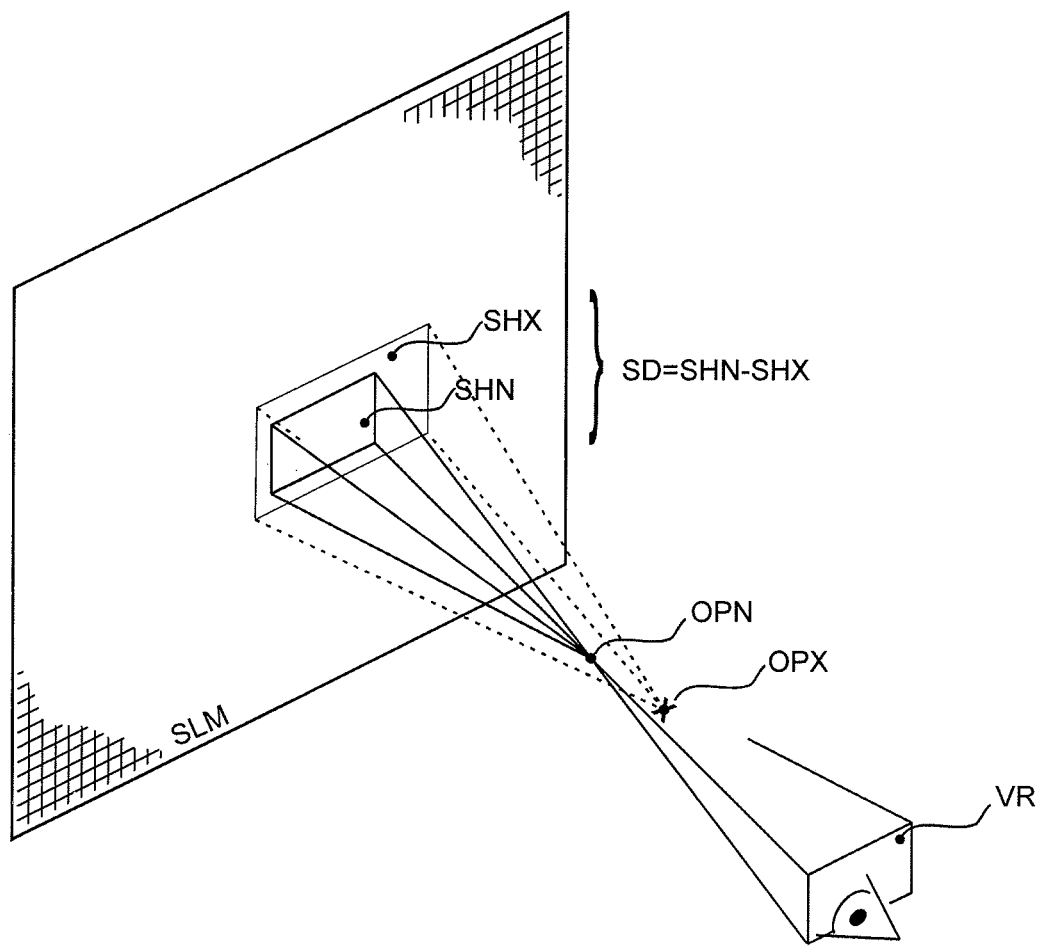
FIG. 1c shows the differential sub-hologram for a disappearing point.

As shown in FIG. 1c, an object point (OPX) disappeared in the current image ($P_n$) of the sequence compared to the preceding image, so that, as shown in the Figure, an object point (OPN) which has been invisible and hidden in the previous image ($P_{n-1}$) now becomes visible according to the visibility of the observer. In that case, the differential sub-hologram (SD=SHN−SHX) is defined as difference between the sub-hologram (SHX) of the disappeared object point (OPX) and the sub-hologram (SHN) of the newly visible object point (OPN), and can thus be computed.

The third case of a fix object point with different colour and/or intensity will be described below without reference to a certain Figure. The differential sub-hologram here describes the corresponding colour or intensity information. However, it is usually sufficient to specify those changes with the help of descriptive data.

Additional descriptive data are generated and stored for a differential sub-hologram. The descriptive data comprise information which allow or facilitate an assignment of the differential sub-holograms in the screen memory of the display device. As will be seen below in FIG. 4, the descriptive data comprise the position and size of the differential sub-hologram and preferably additional indices for pixel regions, memory sections etc.

Figure 2:
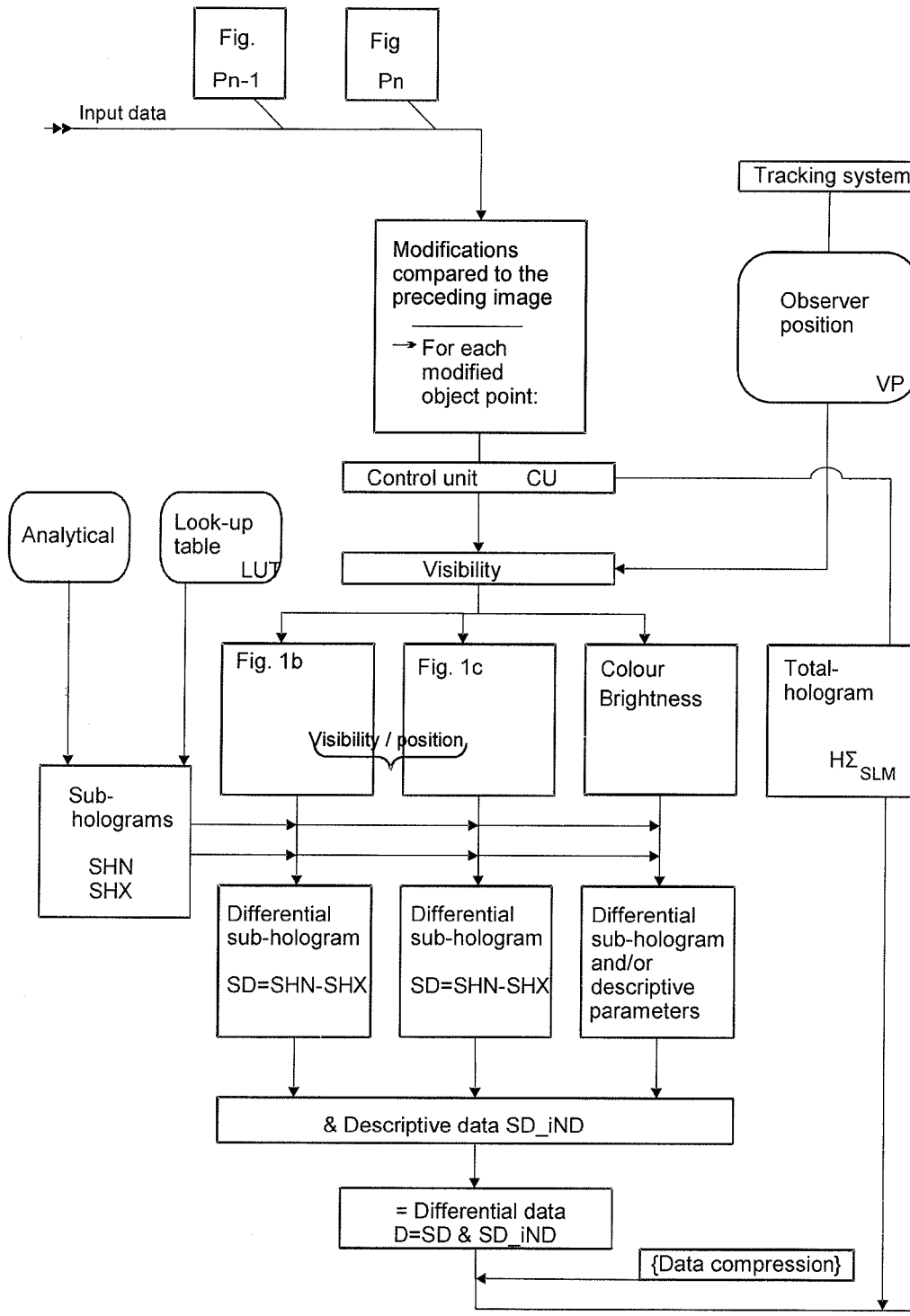
FIG. 2 shows a flowchart of the method.

FIG. 2 shows a flowchart of the method. In a first step, the differences to the preceding image are computed for the current image of the sequence. Those data are for example computed by a 3D rendering graphics pipeline. Further, the position of the observer—more precisely the position of his eye pupils or of the visibility regions which cover the eye pupils—is provided. In the course of those preparatory steps, a control means (CU) optimises and decides whether it is more preferable to generate the differential data of the modified object points, or the entire hologram of the entire image. If the image contents differ substantially, as is the case for example after cuts, it can be more preferable to generate the entire hologram (H$\Sigma_{SLM}$). Otherwise, the differential sub-hologram will be computed for each modified object point.

Analogously to what was said under FIG. 1b and FIG. 1c, it is distinguished according to the visibility whether a new, now visible point appears, an object point which had been visible disappears, or the colour and/or intensity of a fix point with unchanged visibility has changed. Analogously to what was said under FIGS. 1b and 1c, the differential sub-hologram is computed as the difference between the sub-holograms of the visible and invisible object points. The sub-holograms are computed analytically or are preferably retrieved from look-up tables. The analytic method is for example based on the principle according to document WO 2006/066919, where the sub-holograms are also preferably retrieved from look-up tables with the help of that method.

Document WO 2006/066919 filed by the applicant describes a method for computing video holograms. In particular, the hologram values of the sub-hologram of an object point are computed using that method and by carrying out the following steps aided by a computer A diffraction image is computed in the form of a separate two-dimensional distribution of wave fields for an observer plane which is situated at a finite distance and parallel to the section planes, from each object data set of each tomographic scene section, where the wave fields of all sections are computed for at least one common visibility region, The computed distributions of all section layers are added to define an aggregated wave field for the visibility region in a data set which is referenced in relation to the observer plane, and For generating a hologram data set for a common computer-generated hologram of the scene, the reference data set is transformed into a hologram plane, which is situated at a finite distance and parallel to the reference plane, where the light modulator means lies in the hologram plane.

In the third case, i.e. the case of a fix object point with colour and/or intensity changes, the differential sub-hologram of the colour or intensity changes can also be determined. However, it is usually sufficient to describe those changes with the help of descriptive parameters.

The descriptive data for the differential sub-hologram are computed in the following step. As can be seen in or derived from FIG. 1a, those data comprise the position and size of the differential sub-hologram on the light modulator means (SLM) and index sections, memory sections, address ranges and the like. The holographic display device (HAE) preferably comprises the memory sections or address ranges of a screen memory (VRAM), which are required for the differential sub-hologram. Generally, those descriptive data make enable, control or facilitate the representation on the light modulator. The initialization data of the holographic display device and particularly of the light modulator are here assumed to be known. Those data are for example retrieved or read by the holographic display device. As regards the descriptive data, reference is made in this respect to FIG. 3, where the processing of the data generated here by the holographic display device is described. The differential sub-hologram (SD) of an object point and the corresponding descriptive data (SD_IND) together form the differential data (D) which are now provided, if necessary after further data compression, to the storage means, transmission means or to the holographic display device.

Figure 3:
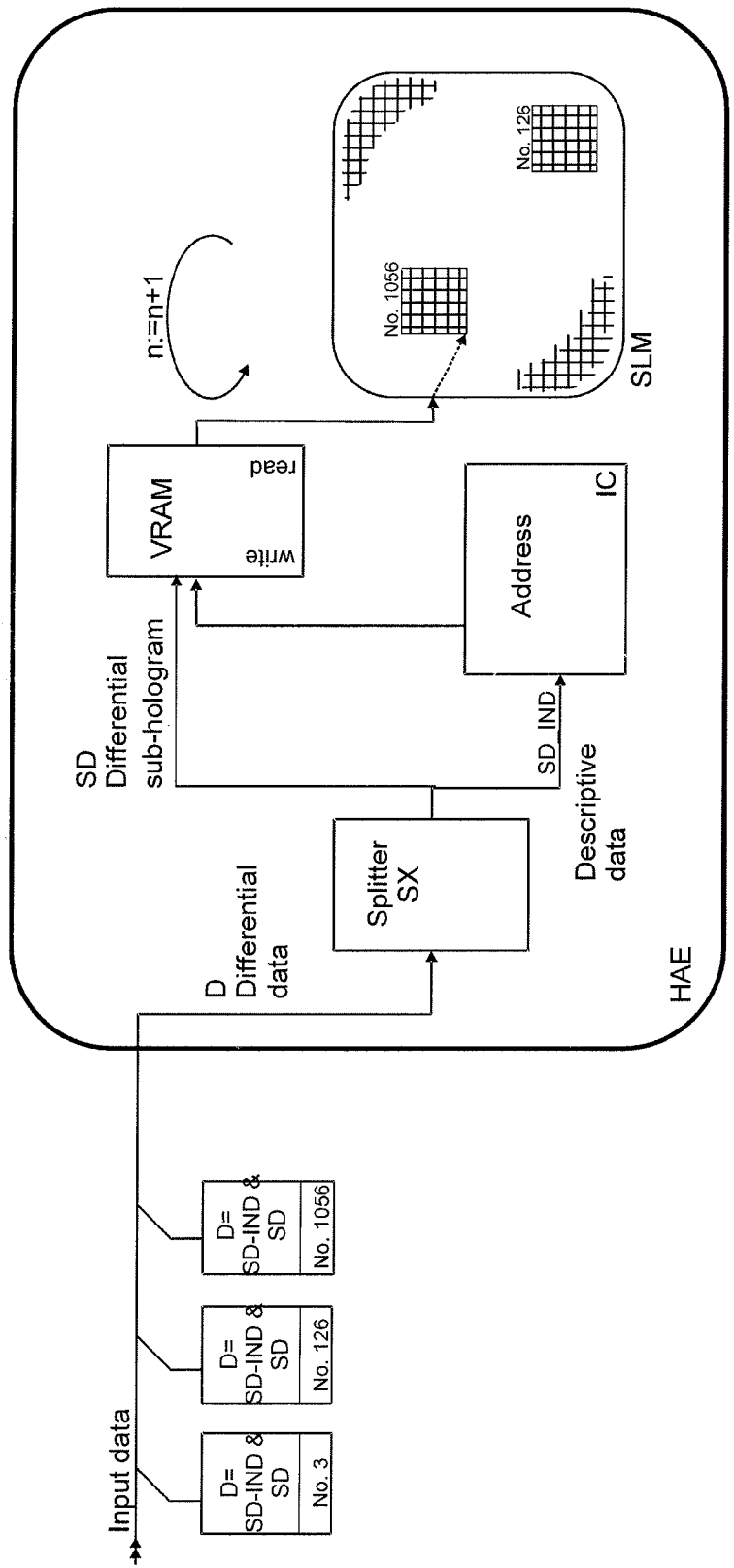
FIG. 3 shows a flowchart of the holographic display device.

FIG. 3 shows a schematic diagram of the holographic display device (HAE) and illustrates the principle of displaying the video holograms generated according to the method without loss of quality. According to the method, the input data for the display device comprise the differential data (D) which correspond to an object point and which are composed of the descriptive data (SD_IND) and the differential sub-hologram (SD). With the descriptive data, the differential data of an object point comprise any data which is required for further processing. The differential data is exemplarily indicated in the Figure by point indices '3', '126' and '1056', which implies that it is possible to transfer the differential data in random order.

The display device comprises a light modulator means (SLM). The data of the pixel values for addressing the light modulator means (only shown schematically here) are read from a screen memory (VRAM).

The display device additionally comprises:
A splitter (SX), as a means for detecting the differential data (D) and dividing them into descriptive data (SD_IND) and data of the differential sub-hologram (SD), and
Means for describing the data of the differential sub-hologram (SD) according to the descriptive data (SD_IND) in the screen memory (VRAM).

Additional computing means (IC) which compute the memory sections or address ranges of the differential sub-holograms may be necessary, unless this information is entirely contained in the descriptive data. Those computing means (IC) are preferably combined with the splitter (SX).

The screen memory (VRAM) maintains the pixel values, so that the values are kept also for the subsequent display intervals until they are overwritten with a new value.

In this embodiment, the light modulator (SLM) is an active matrix display whose pixel values must be refreshed continuously in order not to lose information. The entire image content in the screen memory (VRAM) must be provided to the light modulator in each refresh cycle. The entire image content is thus read from the screen memory in a refresh cycle and the pixels are addressed or refreshed. This is why a special screen memory (VRAM) is suggested which is able to read and write simultaneously. As can bee seen in the Figure, it is ensured that on the one hand the new differential sub-holograms (SD) are stored in the writing mode, while at the same time in the reading mode the content of the entire screen memory (VRAM) is read and the information is transferred to the light modulator (SLM) for addressing its pixels. For such a type of screen memory, dual-port RAMs or other memory technologies which have a similar functional principle and which are able to read and write simultaneously can be used. In this Figure, the pixel regions of the sub-holograms are shown schematically on the light modulator (SLM) for the differential data to be processed. It can thus be seen again that the reconstruction of a single object point only requires a sub-hologram as a subset of the entire hologram ($H\Sigma_{SLM}$) which is encoded on the light modulator (SLM).

A particularly preferred method for generating the sub-holograms will be explained below with the help of FIG. 4 to 7. The method is based on a three-dimensional scene (3D-S) with colour and depth information, which is composed of a multitude of object points. Also if sub-holograms are preferably used, a pixel, which represents the smallest controllable unit of the light modulator, does not only comprise the information of a single sub-hologram, but, as a result of the superpositions, the information of multiple sub-holograms.

The preferred method is based on the idea that the complex hologram values of a sub-hologram are computed in a modulator region of the light modulator means from the wave front of the object point to be reconstructed, in that the transmittance functions or modulation functions of a projection element, which is modelled in the modulator region and in whose focal point the object point to be reconstructed lies, are computed and analysed. The hologram plane is defined by the position of a screen means, where for simplification the screen means will be the light modulator itself in the following description.

According to a preferred embodiment of the method, the projection element includes a lens which is disposed in the hologram plane, which has the focal length f and which is inclined. An inclined lens is composed of a lens which is not inclined in relation to the hologram plane and a prism which is effective in both the horizontal and vertical direction. Strictly speaking, a prism does not define a sub-hologram, because no object point is reconstructed due to the non-focal prism function.

However, in order to maintain a certain clarity of the inventive thought, this will be described so, because the prism also contributes its part to the complex hologram values in the modulator range. The method will be described below in detail with the example of a lens and a prism. Of course, the method also applies to a lens or a prism on its own; in such case, the process steps or the corresponding terms are not carried out or are neglected. For computing the complex values of the sub-hologram, this detailing of the method comprises the following steps for each visible object point of the scene:

A: Determining the size and position of the modulator region as described above, but the modulator region will then be given a local coordinate system, where the point of origin is located in its centre, the x axis describes the abscissa and the y axis describes the ordinate. 'a' is the half-width and 'b' the half-height of the modulator region, where those interval boundaries are included in the following terms.
B: Determining the sub-hologram of the lens in the hologram plane:
B1: Determining the focal length f of the lens:

The focal length f of the lens preferably is the normal distance of the object point to be reconstructed from the hologram plane.

B2: Complex values of the corresponding sub-hologram of the lens:

The complex values of the corresponding sub-hologram are determined using the equation $$z_L = \exp\{+/-i*[(\pi/\lambda f)*(x^2+y^2)]\},$$

where $\lambda$ is the reference wavelength, f is the focal length and (x, y) is the corresponding coordinate pair. The negative sign here is due to the characteristic of a concave lens. A convex lens would be identified by a positive sign.

B3: Thanks to the symmetry in regard to the x and y axes, it is sufficient to determine the complex values in one quadrant and to apply the values to the other quadrants by using a rule of sign.

C: Determining the sub-holograms of the prisms (P) in the hologram plane:

The chosen prisms run through the abscissa or ordinate, as shown in the figures below.

C1: Determining the linear factor $C_x$ of the prism (PH) with horizontal effective direction, which is described by the following equation in the interval $$x \in [-a, a]$$

$$C_x = M*(2\pi/\lambda);$$

where M is the inclination of the prism.

C2: Determining the linear factor $C_y$ of the prism (PV) with vertical effective direction, which is described by the following equation in the interval $$y \in [-b, b]$$

$$C_y = N*(2\pi/\lambda);$$

where N is the inclination of the prism.

C3: Determining the complex values of the corresponding sub-hologram of the combined prisms:

The complex values for the corresponding sub-hologram are determined by superposing the two prism terms:

$$z_P = \exp\{i*[C_x*(x-a) + C_y*(y-b)]\}$$

The superposed prism runs through the point of origin of the local coordinate system.

C4: A prism term can be omitted if the holographic display device exhibits the characteristic to project the light source into the visibility region.

D: Modulating the sub-holograms for lens and prisms:

The complex values of the lens and prisms are complexly multiplied in order to determine the combined sub-hologram:

$$z_{SH} = z_L * z_P$$

or, symbolically, $$SH = SH_L * SH_P$$

E: Application of the random phase:

Each modulated sub-hologram from step D is assigned with a random phase in order to ensure a homogeneous brightness distribution in the visibility region. The random phase is added to the sub-hologram by way of a complex multiplication:

$$z_{SH} := z_{SH} \exp(i\varphi_0)$$

or, symbolically, $$SH := SH \exp(i\varphi_0)$$

The random phase is individually assigned to each sub-hologram. Globally, the random phases of all sub-holograms are preferably distributed homogeneously.

F: Intensity modulation:

The complex values are given an additional multiplication factor, which represents the intensity or brightness:

$$z_{SH} = C * z_{SH}$$

or, symbolically, $$SH := C * SH;$$

G: If the entire hologram is computed, the sub-holograms will be superposed so to form the entire hologram. In a simple embodiment, the sub-holograms are complexly added to the entire hologram, considering the position of the sub-holograms.

Entire hologram=complex sum of all sub-holograms with $$H\Sigma_{SLM} = \Sigma SH_i$$

or, symbolically, $$z_{SLM} = \Sigma z_{SHi}$$

(with regard to a global coordinate system)

The method is preferably used for visible object points only. The visibility of the object point is determined as a result of the rendering process of the scene by a 3D rendering graphics pipeline, and it depends on the observer position, that is the position of the eye pupils, and thus from the position of the visibility region, which is tracked to the position of the pupils.

The detailed description relates to the computation of the best possible solution. It is of course generally possible to replace the above-described function terms with more simple function terms, if a reduced reconstruction quality is accepted or even desired. However, it can be seen that updated process steps are applied in order to improve the reconstruction quality. Lenses or prisms can for example be chosen such to correct aberrations, tolerances of light modulator means etc. The same also applies to the exemplarily mentioned methods for determining the modulator region.

Figure 4:
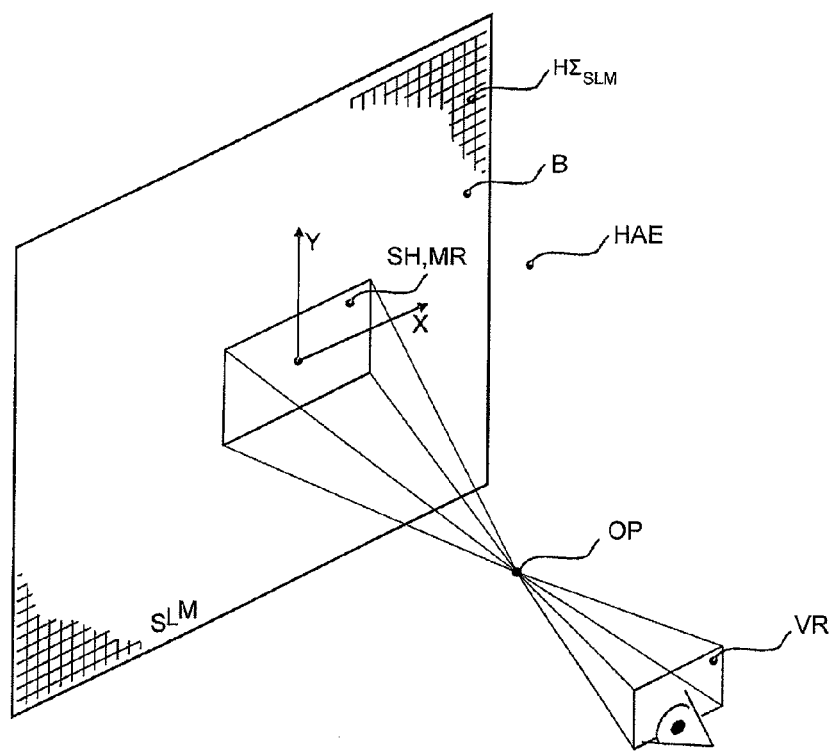
FIG. 4 illustrates the principle on which a holographic display device is based, and a modulator region representing an object point.

As can be seen in FIG. 4, which is based on FIG. 1, the modulator region (MR) will be given a coordinate system, where the point of origin is located in its centre, the x axis describes the abscissa and the y axis describes the ordinate. The modulator region (MR) has the half-width 'a' and the half-height 'b'.

Figure 5A:
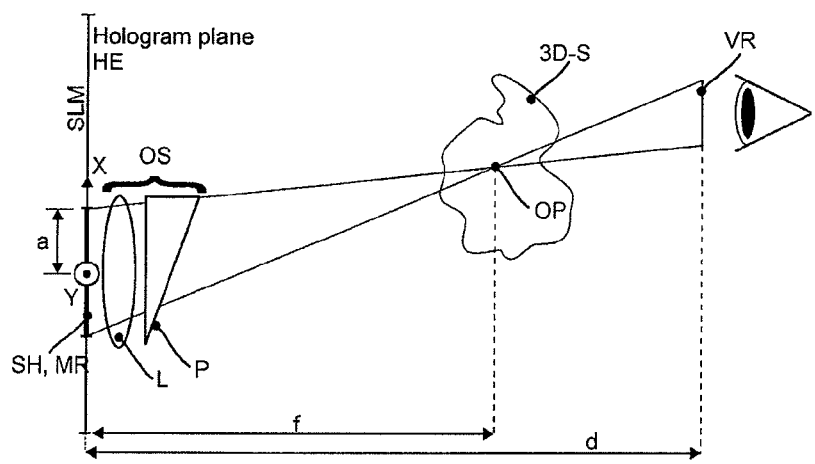
FIG. 5a is a side view of the display device with a projection element comprising a lens and a prism.

FIG. 5a is a side view of the holographic display device (HAE), illustrating the general principle of the method. Similar to FIG. 4, the modulator region (MR) is derived from the visibility region (VR). This region is located in the hologram plane (HE), where the light modulator (SLM) is disposed. The modulator region is given the above-mentioned coordinate system. The projection element (OS), which is here composed of a focussing lens (L) and a prism (P), lies in the modulator region (MR). The Figure only shows the vertically effective prism wedge, and the projection element (OS) is shown in front of the hologram plane (HE) to make things clearer.

Figure 5B:
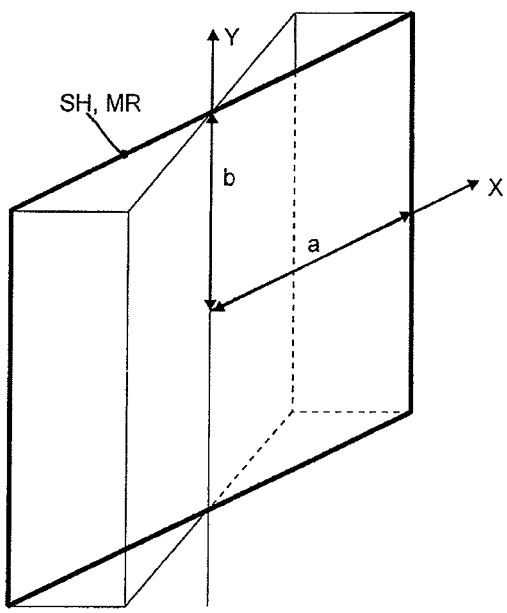
FIG. 5b shows a modulator region and a vertically effective prism.

FIG. 5b shows a horizontally effective prism wedge (PH) in front of the modulator region (MR) together with the coordinates and dimensions used. The prism wedge here runs through the ordinate.

Figure 5C:
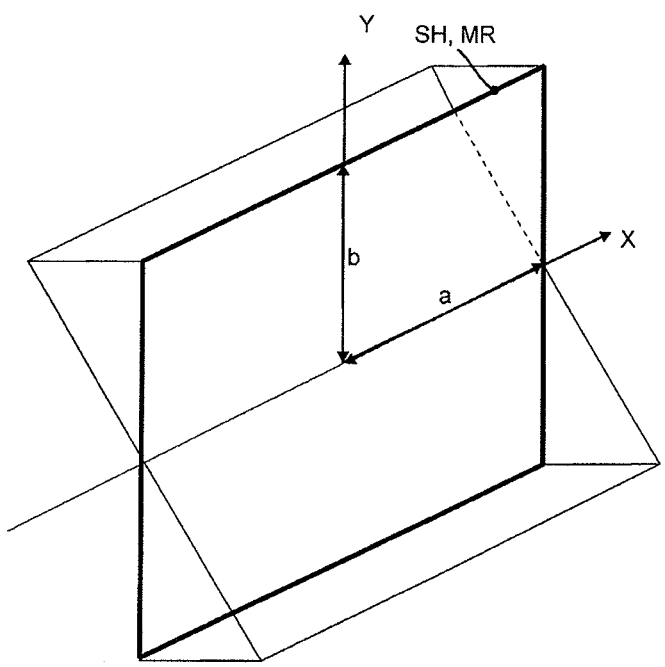
FIG. 5c shows a modulator region and a horizontally effective prism.

FIG. 5c analogously shows a vertically effective prism wedge (PV), which runs through the abscissa. The two prism wedges are superposed as described below.

Figure 6:
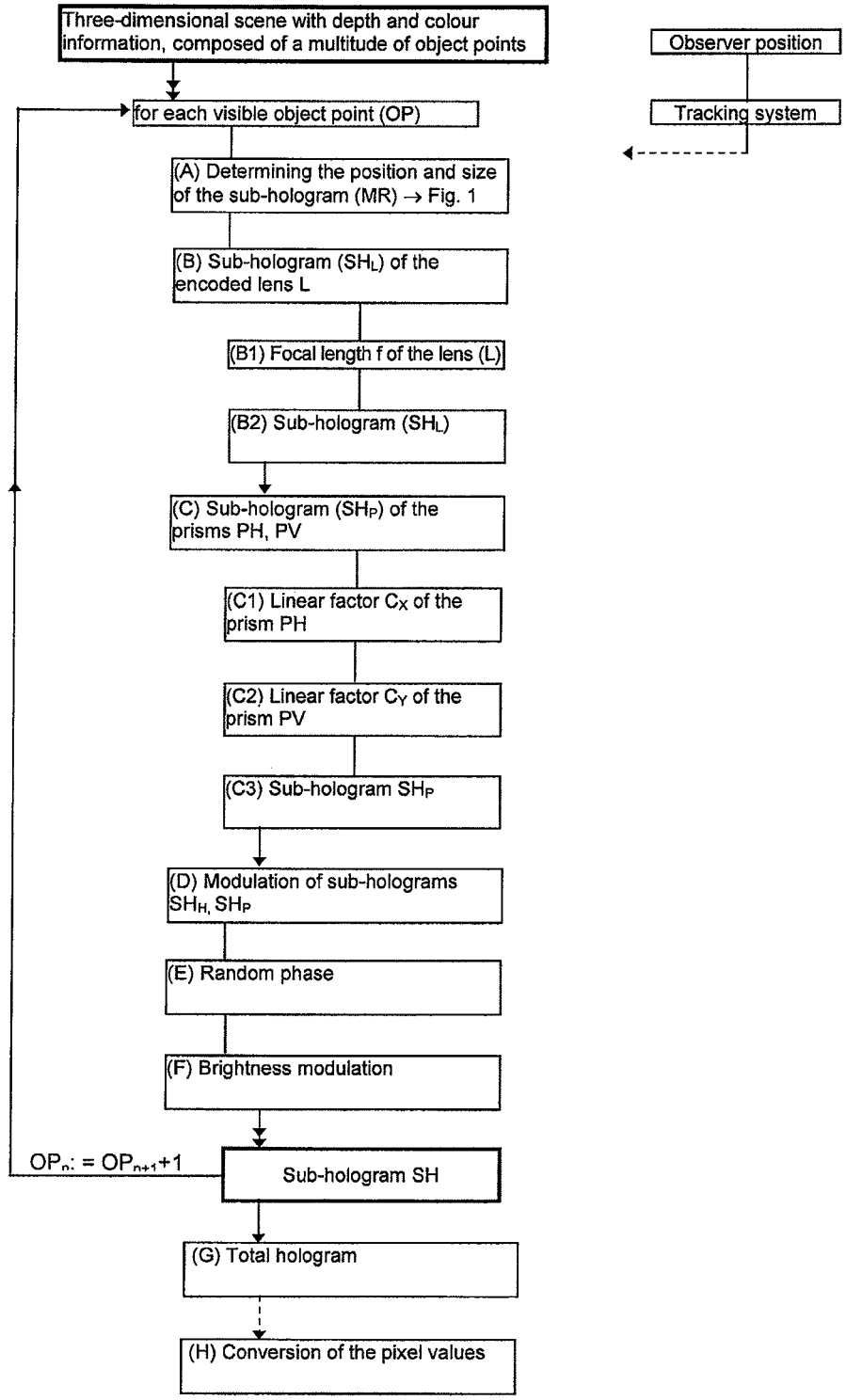
FIG. 6 shows a flowchart of the method according to the present invention.
Figure 7:
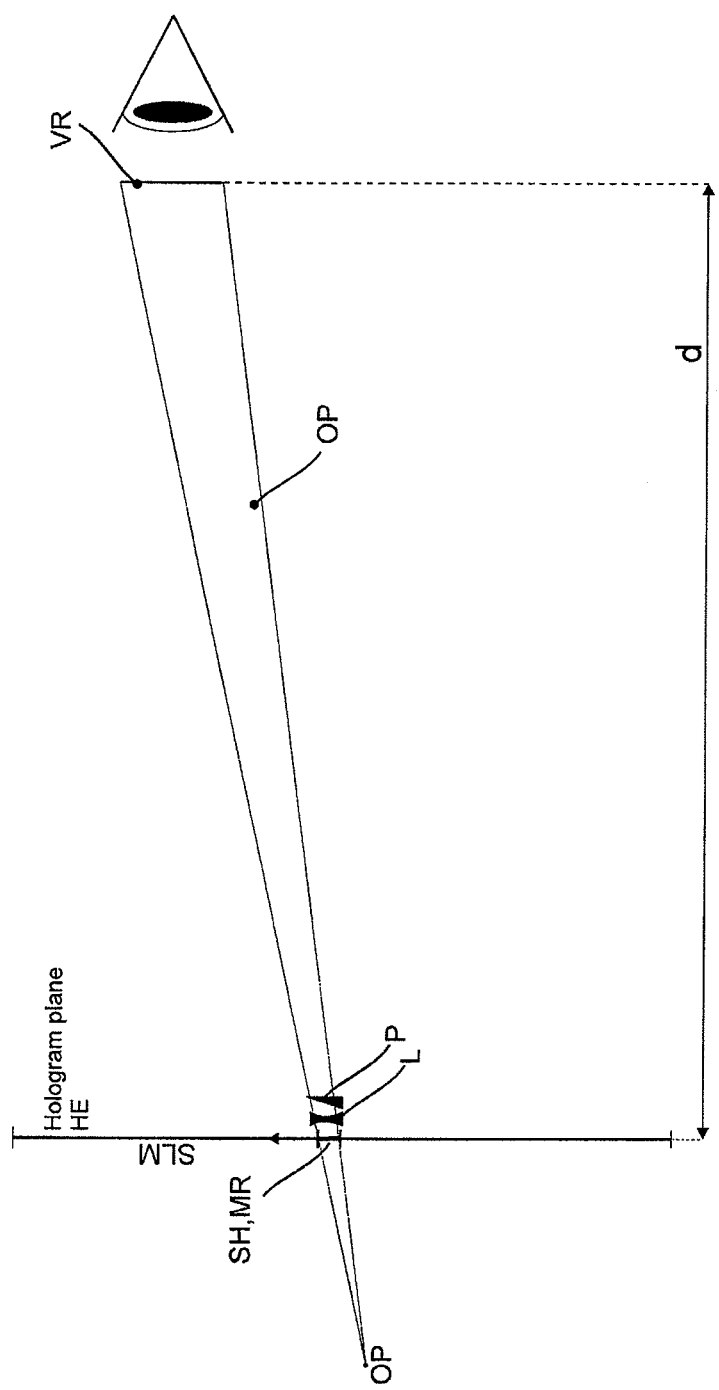
FIG. 7 shows an option of the method for the reconstruction of an object point behind the hologram plane.

FIG. 6 shows a flowchart of the preferred method. Starting point of the method is a three-dimensional scene (3D-S) which is composed of a multitude of object points (OP). Colour and depth information is available for the object points (OP). The visibility of an object point is determined, based on its depth information, depending on the observer position, i.e. that of the eye pupils of the observer. In step (A), size and position of the respective modulator regions (MR) in the hologram plane (HE), or on the light modulator means, are determined for each visible object point. According to the idea of the present invention, the object point (OP) to be reconstructed is interpreted as the focal point of a projection element which lies in the hologram plane. The projection element here is interpreted as combination of a focussing lens (L) and, as shown in FIGS. 2b, 2c, of vertically or horizontally effective prisms (PH, PV). In step (B1), the focal length of the lens (L) is thus determined for each visible object point as the normal distance of the object point (OP) from the hologram plane (HE). In step (B2), the complex values for the corresponding sub-hologram ($SH_L$) are determined using the equation $$z_L = \exp\{-i*[(\pi/\lambda f)*(x^2+y^2)]\}$$

where $\lambda$ is the reference wavelength, f is the focal length and (x, y) is the corresponding local coordinate pair. The coordinate system is defined as described above.

In step (C), the sub-holograms ($SH_P$) of the prisms (P) in the hologram plane are determined. The linear factor $C_x$ of the prism (PH) with horizontal effective direction is determined using the equation $C_x = M*(2\pi/\lambda)$, where M is the inclination of the prism. The linear factor $C_y$ of the vertically effective prism is found with an analogous equation, but with the inclination N. The complex values of the corresponding sub-hologram ($SH_P$) are determined by superposing the two prism terms:

$$SH_P := z_P = \exp\{i*[C_x*(x-a)+C_y*(y-b)]\}$$

One prism term can be omitted if the holographic display device exhibits the characteristic to project the light source into the visibility region (VR).

Now that the sub-holograms ($SH_L$) of the lens (L) and those ($SH_P$) of the prisms (P) are available, they are superposed in step (D) so to form the combined sub-hologram (SH) by complexly multiplying the complex values of the lens and of the prisms:

$$z_{SH} = z_L * z_P$$

or, symbolically, $$SH = SH_L * SH_P$$

In step (E), the sub-hologram (SH) is given a homogeneously distributed random phase.

In step (F), an intensity modulation is performed, where the sub-hologram (SH) is multiplied with an intensity factor:

$$z_{SH} = C * z_{SH}$$

or, symbolically, $$TH := C * TH$$

As desired, the combined sub-hologram (SH) of an object point (OP) is now completely available.

In an additional process step (G), it would be possible to add the sub-holograms of the object points so to form a entire hologram ($H\Sigma_{SLM}$). The individual sub-holograms ($SH_i$) of the object points are superposable and are complexly added so to form the entire hologram ($H\Sigma_{SLM}$).

Entire hologram=complex sum of all sub-holograms of the object points with $$H\Sigma_{SLM} = \Sigma SH_i$$

or $$z_{SLM} = \Sigma z_{SHi}$$

(with regard to a global coordinate system)

The entire hologram ($H\Sigma_{SLM}$) represents the hologram of all object points. It thus represents and reconstructs the entire scene (3D-S).

With the help of this method, the sub-holograms for an interactive real-time holographic reconstruction can be generated for object points at any position in the reconstruction space using standard hardware components which are commercially available today. The preferred method is preferably used to determine the sub-holograms and to fill look-up tables with those sub-holograms. In analogy to the method and device according to the present invention, the preferred method is suitable for holographic display devices which also preferably take advantage of the principle of sub-holograms. This includes in particular, as already mentioned above, devices described in WO 2004/044659, WO 2006/027228, WO 2006119760, and DE 10 2006 004 300.

LIST OF REFERENCE NUMERALS

HAE Holographic display device
B Screen means of the HAE
SLM Light modulator means of the HAE
VRAM Screen memory of the HAE
SX Splitter of the HAE
IC Computing means of the HAE
3D-S Scene, composed of object points
VR Visibility regions
OP Object point, general
$OP_n$, $OP_{n+1}$, .... Object point, with reference index
OPN Newly visible/current object point
OPX Obsolete object point
SH Sub-hologram, general
$SH_i$ Sub-hologram, general, indexed
SD Differential sub-hologram
SHN Sub-hologram of a new object point
SHX Sub-hologram of an obsolete object point
MR Modulator region
SD_IND Descriptive data for a differential sub-hologram
D Differential data as a combination of differential sub-hologram and descriptive data
$H\Sigma_{SLM}$ Entire hologram
$P_n$ Image of a sequence
$P_{n-1}$, $P_n$, $P_{n+1}$ Image sequence of a sequence
CU Control means

The invention claimed is:

1. A method for generating video holograms for a holographic display device with at least one light modulator means, comprising:
dividing a scene into object points;
encoding the scene as an entire hologram onto said at least one modulator means;
tracking a variable position of an observer eye, said position of said observer eye comprising a visibility region and the scene being viewable as a reconstruction from the visibility region, the visibility region lying within one periodicity interval of the reconstruction;

encoding sub-holograms on the light modulator means, each of said sub-holograms being a subset of the entire hologram and comprising a size and a position depending on the position of the visibility region and a position of an object point of the scene to be reconstructed; and forming the entire hologram by superpositioning of said sub-holograms, where, in a sequence of image contents for each image:

the differential sub-holograms of object points which differ in subsequent images of the sequence are generated, where a differential sub-hologram is defined with regard to the visibility from the observer eyes:

(a) by the difference of the sub-hologram of an object point which disappeared in the current image, and the sub-hologram of an object point which was covered by the object point which disappeared in the preceding image and which is now visible, or (b) by the difference of the sub-hologram of an object point which is now visible in the current image and the sub-hologram of an object point which was covered by another object point in the preceding image, and (c) in the case of unchanged visibility, the sub-holograms of the colour and intensity changes at the position of the object point, or data which describe such changes, where the generated video holograms are provided to storage means or transferred to the holographic display device.

2. Method according to claim 1, wherein differential data, which comprise a differential sub-hologram and the corresponding descriptive data, are generated.

3. Method according to claim 2, wherein the descriptive data of a differential sub-hologram comprise data which enable, control or facilitate the representation on the light modulator.

4. Method according to claim 3, wherein the descriptive data include at least the position and size of the differential sub-hologram on the light modulator means.

5. Method according to claim 4, wherein the descriptive data include information about the memory sections or address ranges of the screen memory of the holographic display device required for the differential sub-hologram.

6. Method according to claim 2, wherein the differential data of object points are generated in random order.

7. Method according to claim 2, wherein control means optimise and decide whether to compute the differential data or, alternatively, the entire hologram for an image.

8. Method according to claim 2, wherein the differential data of one or more object points are transferred to the holographic display device immediately after having been generated.

9. Method according to claim 2, wherein the complex hologram values are converted into pixel values of the light modulator means.

10. Method according to claim 9, wherein the complex hologram values are converted into Burckhardt components or two-phase components.

11. Method according to claim 1, wherein the sub-hologram corresponding to an observer position of an object is retrieved from at least one look-up table.

12. Method according to claim 1, wherein the hologram values of the sub-hologram of an object point are computed, or where the corresponding entry of the sub-hologram in one or multiple look-up tables is generated in advance for each possible object point in a defined space, where the following steps are carried out aided by a computer:

computing a diffraction image in the form of a separate two-dimensional distribution of wave fields for an observer plane which is situated at a finite distance and parallel to the section planes, from each object data set of each tomographic scene section, where the wave fields of all sections are computed for at least one common visibility region, adding the computed distributions of all section layers to define an aggregated wave field for the visibility region in a data set which is referenced in relation to the observer plane, and for generating a hologram data set for a common computer-generated hologram of the scene, transforming the reference data set into a hologram plane, which is situated at a finite distance and parallel to the reference plane, where the light modulator means lies in the hologram plane.

13. Method according to claim 1, wherein the hologram values of a sub-hologram of an object point are computed, or where the corresponding entry of the sub-hologram in one or multiple look-up tables is generated in advance for each possible object point in a defined space, where the complex hologram values of a sub-hologram in a modulator region of the light modulator means are computed from the wave front of the object point to be reconstructed in that the transmittance functions or modulation functions of a projection element, which is modelled in the modulator region and in whose focal point the object point to be reconstructed lies, are computed and analysed.

14. Method according to claim 13, wherein the projection element comprises at least one lens.

15. Method according to claim 13, wherein the projection element additionally comprises at least one prism.

16. Holographic display device with random addressing, which uses the method according to claim 1, wherein it comprises at least one screen memory from which pixel values are read for controlling the pixels of at least one light modulator means, where in a sequence of images only the changed pixel values of subsequent images are written to the screen memory.

17. Holographic display device according to claim 16, at least comprising a splitter, as a means for detecting the differential data and dividing them into descriptive data and data of the differential sub-hologram, means for computing the memory section or address range in the screen memory which is required for the differential sub-hologram according to the descriptive data, and means for writing the data of the differential sub-holograms according to the descriptive data to the screen memory, which stores the pixel values for the light modulator means until they are overwritten.

18. Holographic display device according to claim 16, wherein the screen memory allows simultaneous writing of the pixel values of the differential sub-holograms and reading of the pixel values for the light modulator means.

19. Holographic display device according to claim 16 with a screen means, where, wherein the screen means is either the light modulator means itself on which the hologram of the scene is encoded, or an optical element onto which a hologram or wave front of the scene encoded on the light modulator means is projected.

20. Holographic display device according to claim 19, wherein the optical element is a lens or a mirror.

\* \* \* \* \*